(12) United States Patent
Arakawa (10) Patent No.: US 8,037,977 B2
(45) Date of Patent: Oct. 18, 2011

(54) DISK BRAKES

(75) Inventor: Takeo Arakawa, Nagoya (JP)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 1013 days.

(21) Appl. No.: 11/896,916

(22) Filed: Sep. 6, 2007

(65) Prior Publication Data

US 2008/0060888 A1    Mar. 13, 2008

(30) Foreign Application Priority Data

Sep. 8, 2006    (JP) .................................. 2006-244260

(51) Int. Cl.
*F16D 65/40*    (2006.01)
*F16D 65/38*    (2006.01)

(52) U.S. Cl. ............... 188/73.38; 188/73.35; 188/73.36; 188/73.37; 188/73.45; 188/250 E (58) Field of Classification Search .... 188/73.35–73.38, 188/73.45, 250 E
See application file for complete search history.

(56) References Cited

U.S. PATENT DOCUMENTS

| 3,625,316 | A | * | 12/1971 | Mori | 188/73.35 |
| 4,342,381 | A | * | 8/1982 | Tamura | 188/73.38 |
| 4,392,561 | A | * | 7/1983 | Watanabe | 188/73.36 |
| 4,428,463 | A | * | 1/1984 | Burgdorf et al. | 188/73.38 |
| 5,358,079 | A | * | 10/1994 | Brown | 188/73.38 |
| 5,875,873 | A | * | 3/1999 | Kay et al. | 188/73.38 |
| 6,644,444 | B1 | * | 11/2003 | Paravisi et al. | 188/73.38 |
| 2004/0262099 | A1 | * | 12/2004 | Crippa | 188/73.35 |

FOREIGN PATENT DOCUMENTS

| JP | 49-72877 | 10/1947 |
| JP | 6-58349 A | 3/1994 |

OTHER PUBLICATIONS

Office Action issued Jul. 13, 2010 by the Japanese Patent Office in Japanese Patent Application No. 2006-244260 and English language translation.

* cited by examiner

*Primary Examiner* — Bradley King
*Assistant Examiner* — Mahbubur Rashid
(74) *Attorney, Agent, or Firm* — Buchanan Ingersoll & Rooney PC (57) ABSTRACT

The present invention includes a disk brake including a caliper having an opening, the opening includes two edges, the caliper also having pin holes positioned adjacent to the two edges, a pad positioned in the opening of the caliper, a pair of pad pins connectable to the pin holes of the caliper and able to movably support the pad and a bias member capable of biasing the pair of pad pins in at least one of a mutually approaching direction and a mutually separating direction, the bias member is capable of elastically pushing the pair of pad pins against hole wall surfaces of the pin holes of the caliper.

9 Claims, 8 Drawing Sheets

FIG. 8

# DISK BRAKES

This application claims priority to Japanese patent application serial number 2006-244260, the contents of which are incorporated herein by reference.

BACKGROUND OF THE INVENTION

The present invention relates to a disk brake, which has a pad and a pad pin to movably support the pad.

Conventionally, various disk brakes are described, for example a disk brake has been described in JP-A-6-58349. The disk brake includes a caliper having an opening, a pad inserted into the caliper from the opening and a pair of pad pins. The caliper has pin holes at the vicinity of both edges of the opening. The pad pins are inserted into the pin holes of the caliper, and the pad are suspended movably by the pair of pad pins. A cushioning material is provided in clearances between the pin holes of the caliper and the pad pins. Accordingly, it is possible in such construction to prevent chattering noise, which the pad pins rattle on the caliper to generate, with the cushioning material.

However, the cushioning material rubs on the pad pins or hole wall surfaces of the pin holes due to vibrations of the pad pins, which reduces the durability. Also, since the cushioning material is a relatively small part, it is difficult to mount, and it provides resistance to insertion of the pad pins into the pin holes, thus making the mountablity unfavorable.

Therefore, there is a need in the art for a disk brake having a construction of reducing or preventing rattle of a pad pin on a caliper, and the construction having improved durability and mountability.

SUMMARY OF THE INVENTION

One aspect of the present invention, The present invention includes a disk brake including a caliper having an opening, the opening includes two edges, the caliper also having pin holes positioned adjacent to the two edges, a pad positioned in the opening of the caliper, a pair of pad pins connectable to the pin holes of the caliper and able to movably support the pad and a bias member capable of biasing the pair of pad pins in at least one of a mutually approaching direction and a mutually separating direction, the bias member is capable of elastically pushing the pair of pad pins against hole wall surfaces of the pin holes of the caliper.

Accordingly, the bias member can prevent rattle of the pad pins in the pin holes of the caliper. Also, because of being provided between the pair of pad pins, the bias member can be mounted relatively easily as compared with a configuration of being inserted into the pin holes. Furthermore, since the bias member is structured not to be inserted into the pin holes, it does not rub on the hole wall surfaces of the pin holes, so that it is excellent in durability. Also, even in the case where the pad pins incline together with the pads, the bias member can continue to push the pad pins against the caliper while allowing the pad pins to incline. Therefore, the bias member does not become an obstacle to the behavior of the pads but can prevent rattle of the pad pins at all times.

DETAILED DESCRIPTION OF THE INVENTION

Each of the additional features and teachings disclosed above and below may be utilized separately or in conjunction with other features and teachings to provide improved disk brake devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
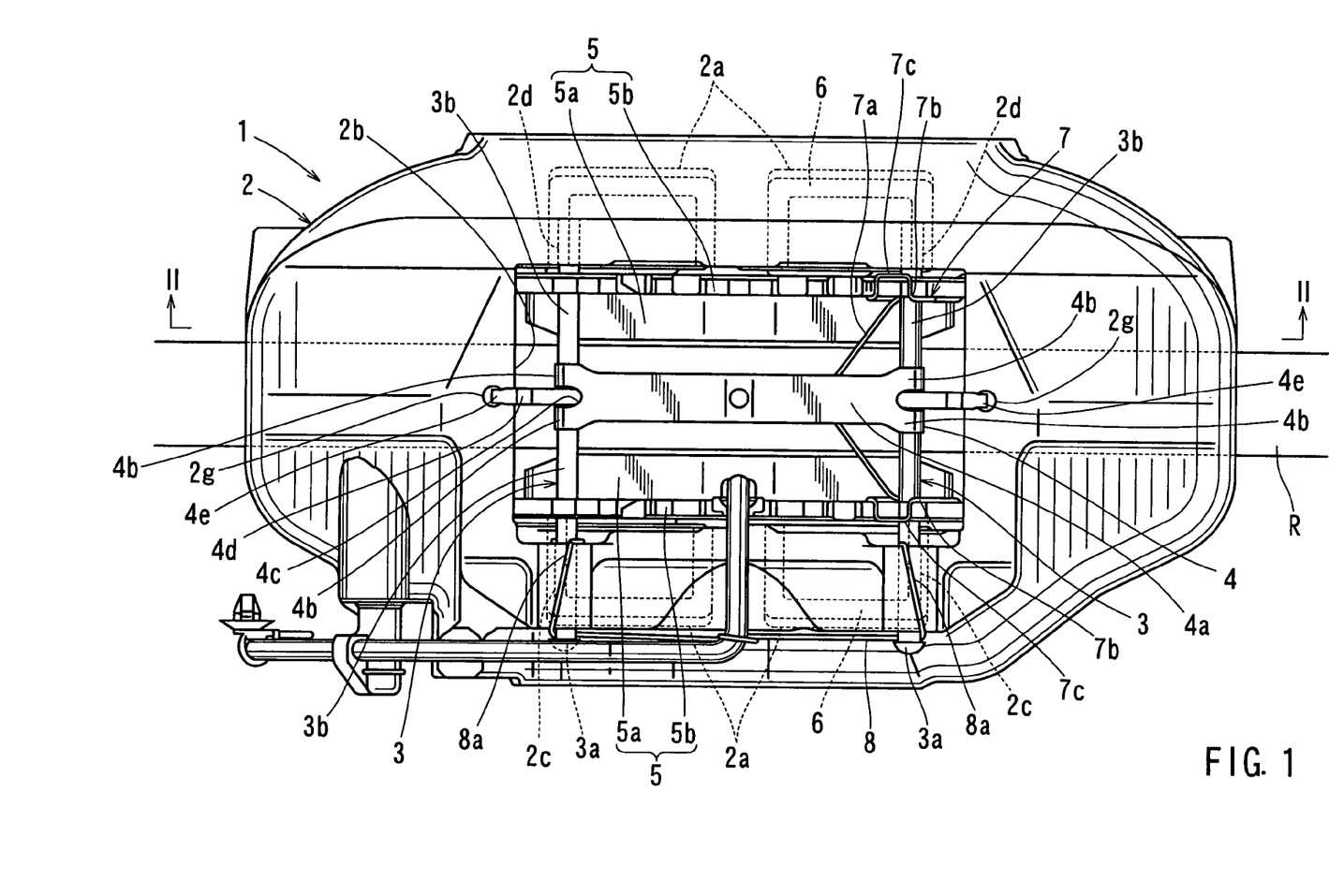
FIG. 1 is a top view of a disk brake.

One configuration of the present invention will be described with reference to FIGS. 1 to 4. A disk brake 1 includes, as shown in FIG. 1, a caliper 2, a pair of pads 5, a pair of pad pins 3 and a bias member 4. The caliper 2 bridges a disk rotor R. The pair of pads 5 are inserted into the caliper 2 from an opening 2b of the caliper 2. The pair of pad pins 3 support the pair of pads 5 movably. The bias member 4 prevents rattle of the pad pins 3.

The caliper 2 includes, as shown in FIG. 1, a plurality of cylinder portions 2a. The cylinder portions 2a accommodate pistons 6 movably on both sides with the disk rotor R therebetween. Hydraulic pressure in the cylinder portions 2a causes the pistons 6 to move, and the pads 5 are pushed against the disk rotor R by the pistons 6. The caliper 2 includes the opening 2b centrally on an outer peripheral surface thereof and the pair of pads 5 are inserted into the caliper 2 from the opening 2b or taken out from the caliper 2.

Figure 2:
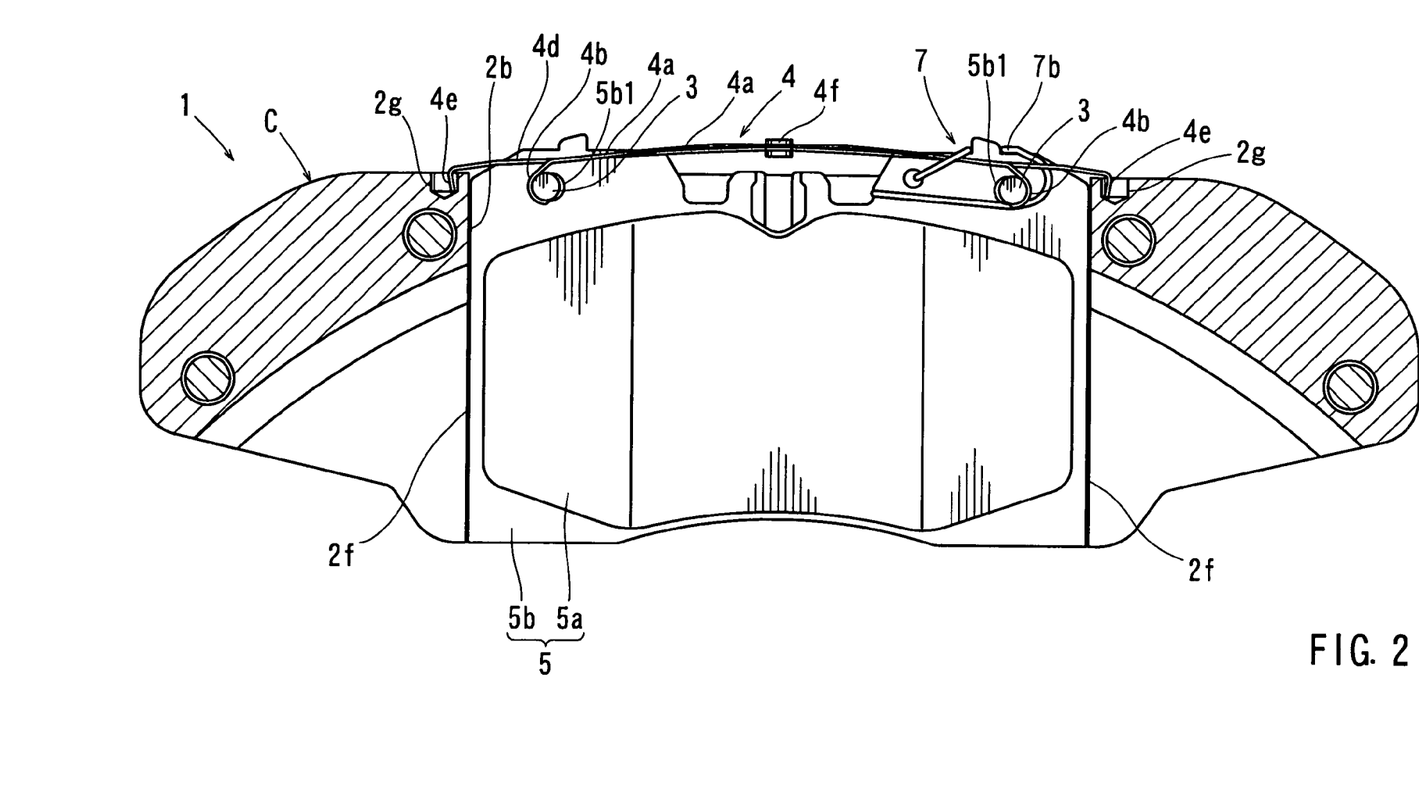
FIG. 2 is a cross-sectional view taken along line II-II in FIG. 1.

A pair of pin holes 2c, 2d, respectively, are formed in the vicinity of both side edges of the opening 2b in a direction of rotor axis as shown in FIG. 1. The pad pins 3, movably supporting the pads 5, are inserted into the pin holes 2c, 2d. Torque bearing portions 2f extending along edges of the pads 5 as shown in FIG. 2 are formed on both sides of the caliper 2 in a direction of rotor circumference. The torque bearing portions 2f sustain a braking torque from the pads 5 at the time of braking.

Each of the pads 5 has a friction member 5a and a back plate 5b, as shown in FIGS. 1 and 2. The friction member 5a is brought into sliding contact with the disk rotor R to generate a frictional force. The back plate 5b supports the friction member 5a from a back surface thereof. The back plate 5b can be made of steel and has a pair of through-holes 5b1 in the vicinity of outer edges thereof in a diametrical direction. The pad pins 3 are inserted into the through-holes 5b1 and the pads 5 are suspended from and supported by the pair of pad pins 3.

The pad pins 3 include a head 3a having a larger diameter than that of the pin holes 2c and a leg 3b having a smaller diameter than that of the pin holes 2c, 2d as shown in FIG. 1. The leg 3b is inserted into the pin hole 2c, the through-hole 5b1 (see FIG. 2) of the pad 5 and the pin hole 2d, in that order. Thus, the leg 3b movably supports pad 5. A drop stop member 8 is mounted in positions close to the heads 3a of the pair of pad pins 3 to prevent the pad pins 3 from coming off of the pin holes 2c, 2d. The drop stop member 8 is formed from a wire spring. The ends 8a of the drop stop member 8 extend through the respective pad pins 3. And a center portion of the drop stop member 8 is hooked on the caliper 2.

A return spring 7 is provided between the pair of pads 5 as shown in FIG. 1. The return spring 7 biases the pads 5 in a direction of separation. The return spring 7 is formed from a wire spring, and includes a bridge portion 7a bridging the pair of pads 5, a pair of coil portions 7b mounted to outer peripheral surfaces of the pad pins 3, and hooking portions 7c hooked on outer peripheral surfaces of the back plates 5b.

A bias member 4 is provided between the pair of pad pins 3 to prevent rattle of the pad pins 3 on the caliper 2 as shown in FIG. 1. The bias member 4 includes a body member 4a and a hook member 4d. The body member 4a biases the pair of pad pins 3 toward each other in a direction of approach to elastically push the pad pins 3 against hole wall surfaces of the pin holes 2c, 2d. The hook member 4d is hooked on the caliper 2.

The body member 4a can function as a plate spring member such that a central portion of the body member 4a can defines a curved surface or a bent surface in a free state. Pawls 4b for engagement with the outer peripheral surfaces of the pad pins 3 are formed at both ends of the body member 4a and the body member 4a are engaged with the pad pins 3 in a state of being elastically deformed as shown in FIGS. 1 and 2. Thereby, the body member 4a biases the pair of pad pins 3 in the direction of approach to elastically push the pad pins 3 against the hole wall surfaces of the pin holes 2c, 2d. In addition, the pin holes 2c, 2d are determined in positions, magnitude and shape so as to abut against the pad pins 3 before the pad pins 3 strike against hole wall surfaces of the through-holes 5b1 of the pads 5.

The hook member 4d can function as a plate spring member. The hook member is longer than the body member 4a and narrower than the body member 4a. A substantially central portion of the hook member 4d is fixed at a substantially central position on an inner peripheral surface of the body member 4a by a rivet 4f. The hook member 4d, in a free state, is smaller in curvature than the body member 4a and respective ends thereof extend through recesses 4c formed between the two pawls 4b of the body member 4a.

While the hook member 4d is elastically deformed as shown in FIGS. 1 and 2, hook portions 4e are hooked on engagement portions 2g of the caliper 2. The engagement portions 2g of the caliper 2 are formed in the vicinity of both radial edges of the opening 2b. The engagement portions 2g are larger in diameter than the hook portions 4e to permit the hook portions 4e to be loosely hooked therein.

As shown in FIGS. 1 and 2, the bias member 4 is provided between the pair of pad pins 3 to bias the pair of pad pins 3 toward each other in the direction of approach to elastically push the respective pad pins 3 against the hole wall surfaces of the pin holes 2c, 2d.

Accordingly, the bias member 4 can reduce or prevent rattling of the pad pins 3 in the pin holes 2c, 2d of the caliper 2. Also, because bias member 4 is positioned between the pair of pad pins 3, the bias member 4 can be mounted relatively easily as compared with a configuration of being inserted into the pin holes 2c, 2d. Furthermore, since the bias member 4 is structured not to be inserted into the pin holes 2c, 2d, it does not rub on the hole wall surfaces of the pin holes 2c, 2d, and thus exhibits excellent durability. Also, even in the case where the pad pins 3 incline together with the pads 5, the bias member 4 can continue to push the pad pins 3 against the caliper 2 while allowing the pad pins 3 to incline. Therefore, the bias member 4 does not become an obstacle to the behavior of the pads 5 but can prevent rattle of the pad pins 3 at all times.

Also, the bias member 4 can function as a plate spring member and include prawls 4b positioned at both ends thereof, which engage with the outer peripheral surfaces of the pad pins 3. Accordingly, by incorporating a plate spring member, it is hard to twist as compared with a wire spring member, and therefore it is possible to surely bias the pad pins 3 in a desired direction. Also, since the bias member 4 engages with the outer peripheral surfaces of the pad pins 3, it can readily engage with the pad pins 3 irrespective of axial angles of the pad pins 3.

Also, the bias member 4 includes the hook portions 4e, which are hooked on the caliper 2 to prevent movement of the bias member 4 in axial directions of the pad pins 3 as shown in FIG. 2. Accordingly, this reduces or prevents the bias member 4 from inadvertently moving in the axial directions of the pad pins 3.

Also, the bias member 4 includes the body member 4a and the hook member 4d as shown in FIG. 2. Pawls 4b are provided at both ends of the body member 4a to engage with the respective pad pins 3. The hook member 4d is provided separately from the body member 4a to extend in the same direction as a longitudinal direction of the body member 4a. The hook portions 4e are provided at both ends of hook member 4d to be hooked on the caliper 2. The body member 4a and the hook member 4d are substantially centrally positioned thereof.

Accordingly, both ends of the hook member 4d extend from substantially centrally of the body member 4a in a cantilever-like manner to engage with the caliper 2. Therefore, the hook member 4d stably restricts movement of the bias member 4 in the axial directions of the pad pins 3 irrespective of the posture of the body member 4a. On the other hand, irrespective of the posture of the hook member 4d, the body member 4a can push the pad pins 3 stably against the hole wall surfaces of the pin holes 2c, 2d of the caliper 2.

Another configuration according to the present invention will be described in reference to FIGS. 5 and 6. This configuration is similar to the one shown in FIGS. 1 to 4. However, a bias member 4 of this configuration includes pad holding portions 4g, which elastically hold pads 5. This configuration will be described below, the description focusing on differences from one shown in FIGS. 1 to 4.

Figure 5:
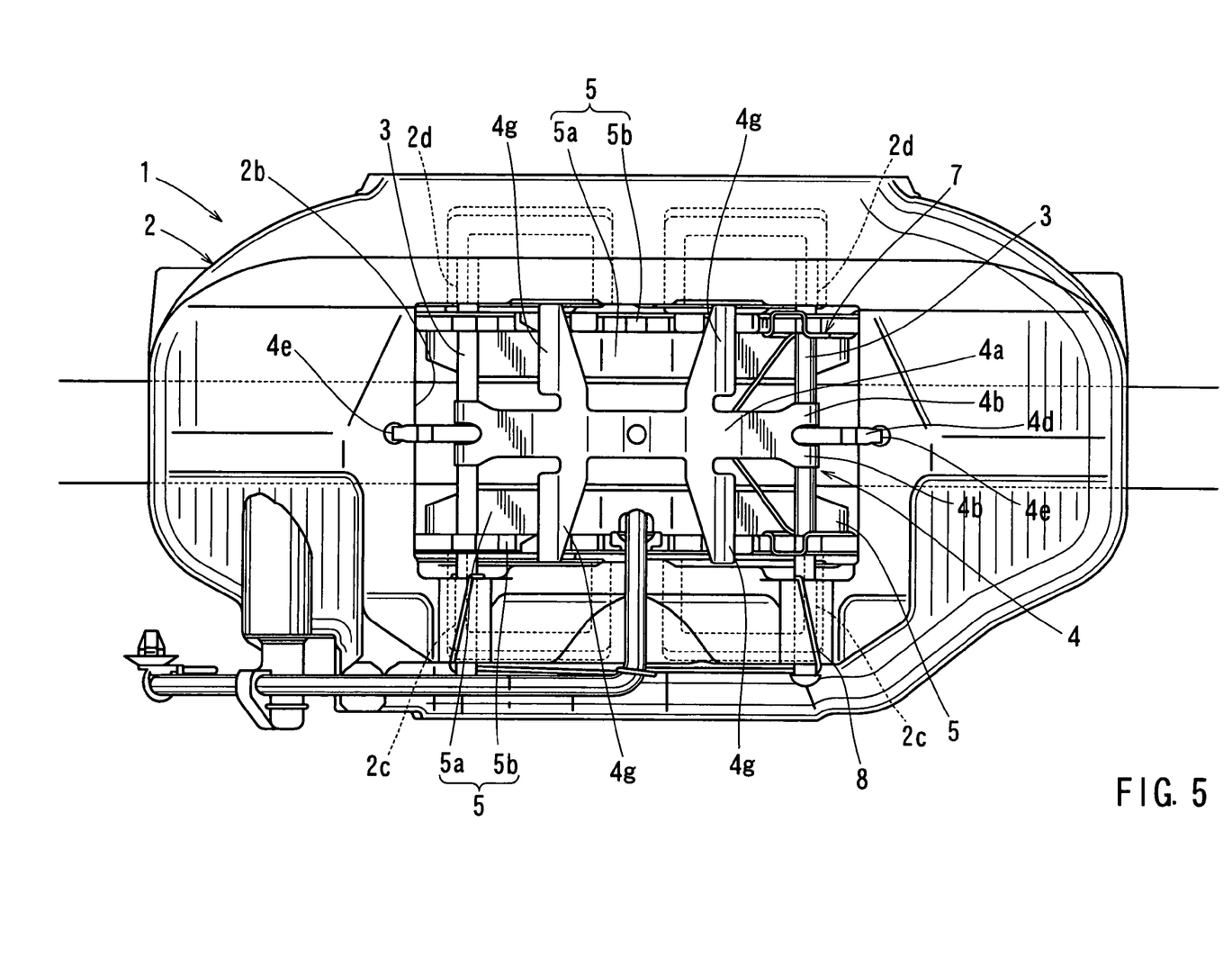
FIG. 5 is a top view of a disk brake of another configuration.
Figure 6:
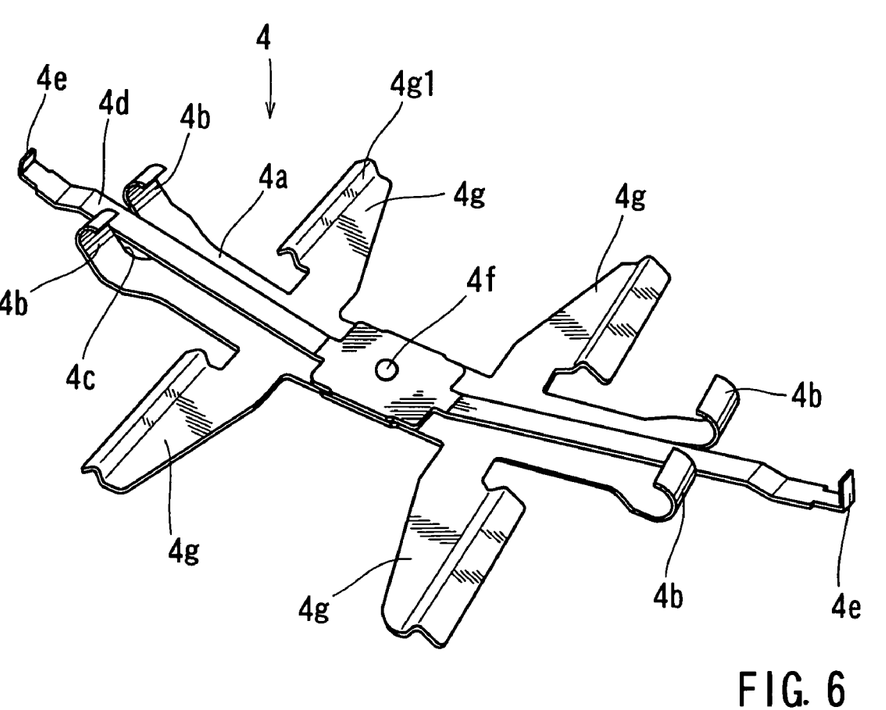
FIG. 6 is a perspective view of a bias member of FIG. 5.

The bias member 4 includes a body member 4a and a hook member 4d as shown in FIGS. 5 and 6. The body member 4a includes a plurality of pad holding portions 4g, which abut against the pads 5 to elastically hold the pads 5. Pad holding portions 4g can be formed two by two on respective widthwise edges of the body member 4a, and can be made integral with the body member 4a. The respective holding portions 4g include bulged portions 4g1, which bulge toward the pads 5 as shown in FIG. 6, the bulged portions 4g1 being caused to abut against radially outer edges of the back plates 5b of the pads 5. The holding portions 4g of the bias member 4 push the pads 5 centrally in a diametrical direction of the rotor to elastically push the hole wall surfaces of the through-holes 5b1 of the pads 5 against the pad pins 3, thus reducing or preventing rattling of the pads 5 on the pad pins 3.

Another configuration according to the present invention will be described in reference to FIG. 7. This configuration is similar to the one shown in FIGS. 1 to 4. However, this configuration includes a bias member 9 shown in FIG. 7 instead of the bias member 4 shown in FIG. 2. This configuration will be described below, the description focusing on differences from one shown in FIGS. 1 to 4.

Figure 7:
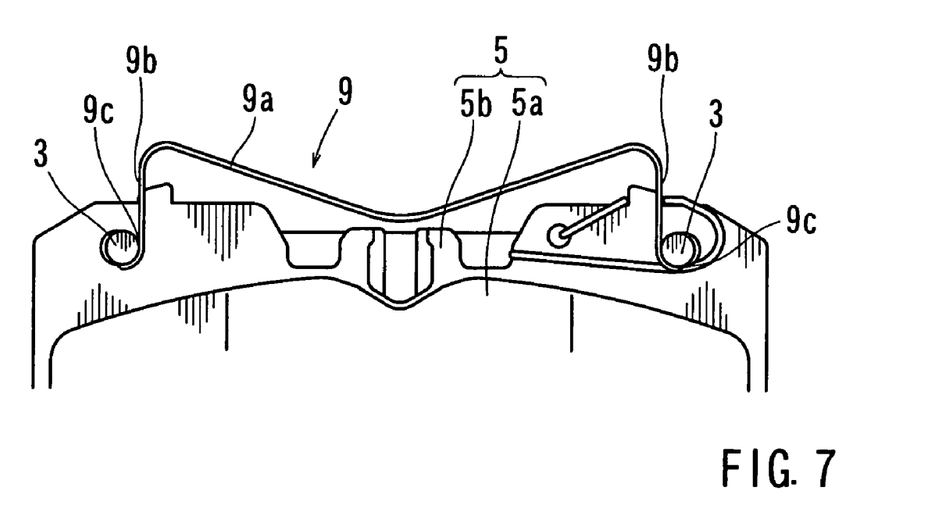
FIG. 7 is a cross-sectional view of a part of a disk brake of another configuration.

The bias member 9 is structured to bias a pair of pad pins 3 separately from each other in a direction of separation as shown in FIG. 7. That is, the bias member 9 can function as a plate spring member, and thus include a curved surface 9a. The curved surface 9a is recessed radially at a center of the bias member 9. The legs 9b and pawls 9c are formed at both ends of the bias member 9. The legs 9b extend toward the pad pins 3 from ends of the curved surface 9a. The pawls 9c engage with outer peripheral surfaces of the pad pins 3. Accordingly, the bias member 9 elastically pushes the pair of pad pins 3 against hole wall surfaces of pin holes of a caliper to reduce or prevent rattling of the pad pins 3 on the caliper.

Another configuration according to the present invention will be described in reference to FIG. 8. This configuration is similar to the one shown in FIGS. 1 to 4. However, a pad pin 3 of this configuration has a groove 3c. And a bias member 4 of this configuration includes only a body member 4a but does not include the hook member 4d shown in FIG. 3. This configuration will be described below, the description focusing on differences from one shown in FIGS. 1 to 4.

Figure 8:
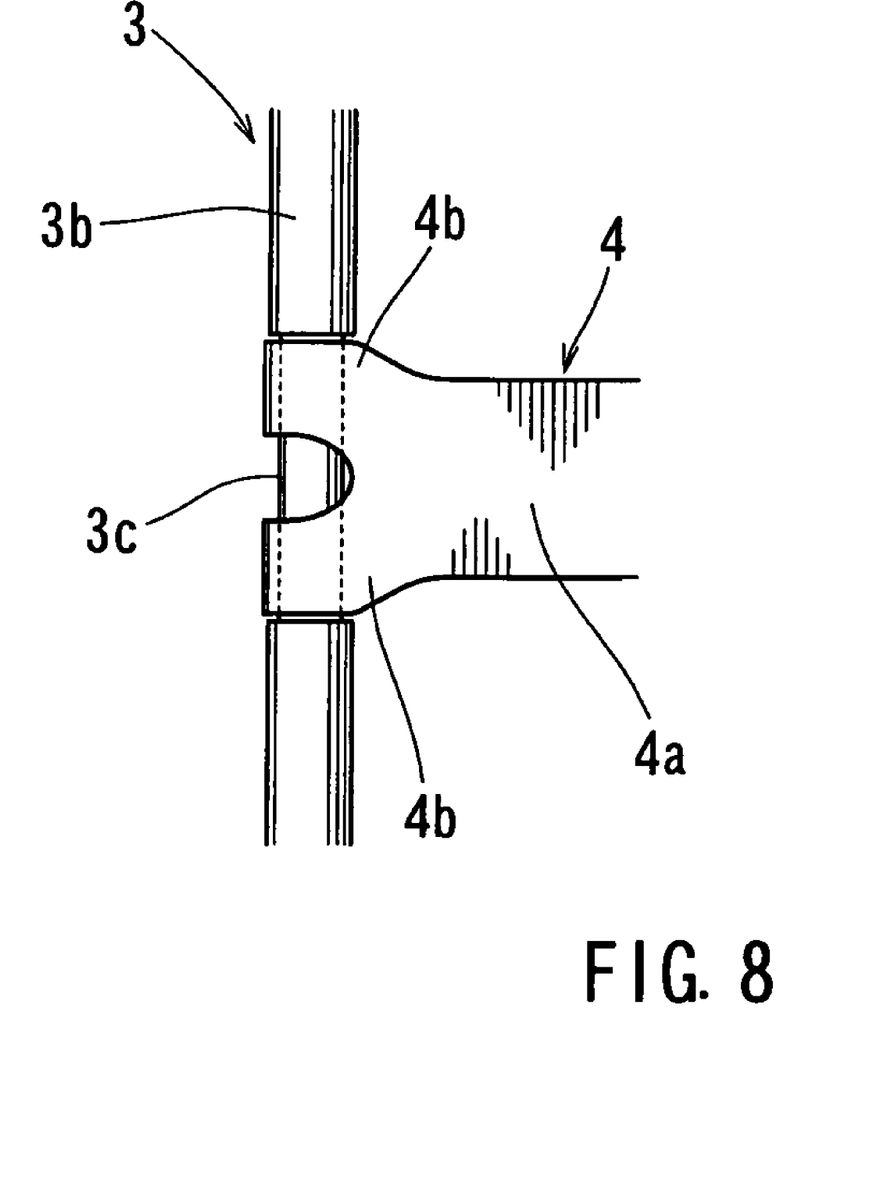
FIG. 8 is a top view of a part of a bias and pad pin of another configuration.

The pad pin 3 has the groove 3c, which is positioned substantially centrally thereof in an axial direction as shown in FIG. 8. Pawls 4b of the bias member 4 are fitted into the groove 3c to reduce or prevent inadvertent movement of bias member 4 in an axial direction of the pad pin 3. The bias member 4 includes a body member 4a, provided at both ends thereof, with the pawls 4b for engagement with a pair of the pad pins 3 but does not include the hook member 4d shown in FIG. 3.

Figure 3:
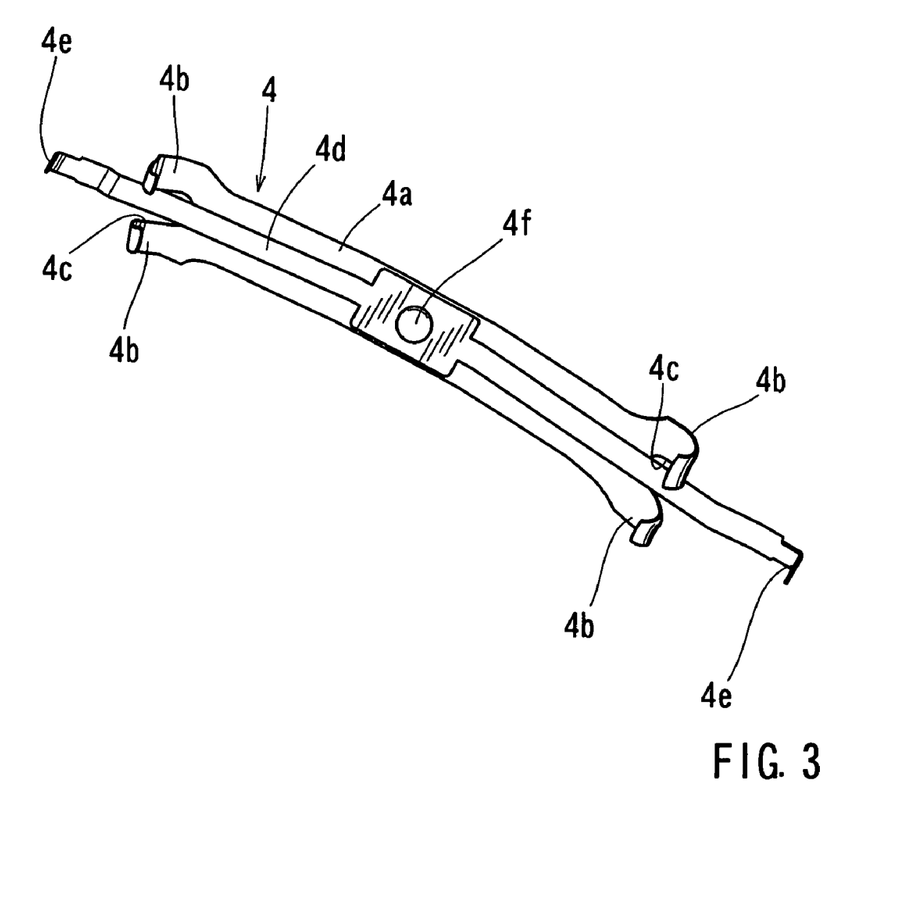
FIG. 3 is a perspective view of a bias member.
Figure 4:
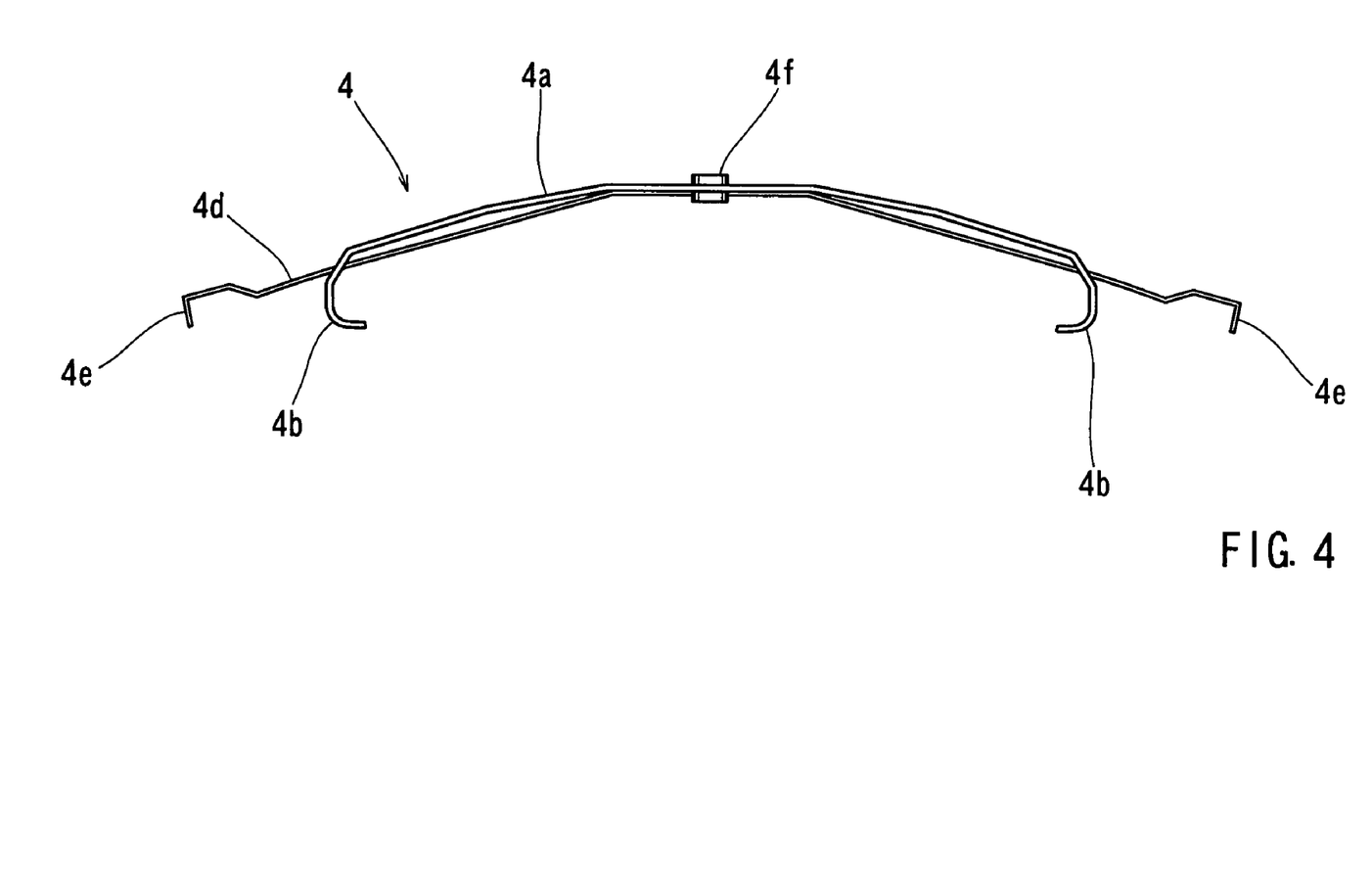
FIG. 4 is a side view of the bias member in a free state.

Another configuration is substantially the same as the last configuration, however it includes bias member 4 shown in FIG. 3 instead of the bias member 4 shown in FIG. 8. That is, the bias member 4 includes a hook member 4d having hook portions 4e at both ends thereof, which are hooked on the caliper 2, and a body member 4a (see FIG. 2). A pad pin 3 is formed with a groove 3c, into which pawls 4b of the body member 4a are fitted (see FIG. 8). Accordingly, movement of the bias member 4 in an axial direction of the pad pin 3 is reduced or prevented. Also, since the bias member 4 is hooked on the caliper 2, it is inhibited from moving relative to the caliper 2. Therefore, the bias member 4 can reduce or prevent the pad pins 3 from axially moving relative to the caliper 2 whereby it is possible to prevent the pad pins 3 from coming off of the pin holes 2c, 2d. Consequently, with this configuration, the drop stop member 8 shown in FIG. 1, is not included.

While the invention has been described with reference to specific configurations, it will be apparent to those skilled in the art that many alternatives, modifications and variations may be made. Accordingly, the present invention is intended to embrace all such alternatives, modifications and variations that may fall within the spirit and scope of the appended claims. For example, the present invention should not be limited to the representative configurations, but may be modified as described below.

In FIGS. 1 to 8, the spring is utilized as a joint member. However, in another mode rubber, such as a rubber string, may be utilized as the joint member.

(1) In the above configurations, the bias members can function as a plate spring member. However the bias members may function as a wire spring member.

(2) In the configuration described in FIGS. 1 to 4, the bias member 4 includes the body member 4a and the hook member 4d as shown in FIG. 3. However the bias member 4 may be configured not to include the hook member but to include only the body member.

(3) One configuration described in FIG. 8 does not have a construction to inhibit the bias member 9 from moving in the axial direction of the pad pins 3. However, that configuration may be provided with a drop stop construction. For example a configuration, in which the hook member 4d shown in FIG. 3 is provided on the bias member 9, or a configuration, in which the groove 3c shown in FIG. 8 is provided. 3 on the pad pin 3, etc. can be included.

This invention claims:
1. A disk brake comprising:
a caliper having an opening, wherein the opening includes two edges, the caliper further including pin holes formed in the vicinity of the two edges;
a pad positioned in the opening of the caliper;
a pair of pad pins insertable into the pin holes of the caliper and able to movably support the pad; and
a bias member provided between the pair of pad pins and able to bias the pair of pad pins in at least one of a mutually approaching direction and a mutually separating direction, wherein
the bias member includes a body member having pawls engageable with the pair of pad pins to elastically push the pair of pad pins against hole wall surfaces of the pin holes of the caliper,
the bias member includes a hook member which extends in the same direction as a longitudinal direction of the body member and which has hook portions connected to the caliper at both ends to inhibit the bias member from moving in an axial direction of the pad pins,
the body member and the hook member have respective plate shapes, and
the body member and the hook member are stacked in layers and are connected to each other substantially centrally by a rivet.
2. The disk brake as in claim 1, wherein the bias member is capable of functioning as a plate spring member, further wherein the pawls are capable of engaging outer peripheral surfaces of the pair of pad pins.
3. The disk brake as in claim 1, wherein an engagement portion is positioned in each of the pair of pad pins, further wherein the pawls of the bias member are connectable into the engagement portions to inhibit movement of the bias member in an axial direction of the pair of pad pins.
4. The disk brake as in claim 1, wherein an engagement portion is positioned on each of the pair of pad pins, wherein the pawls of the bias member are connectable into the engagement portions to inhibit movement of the bias member in an axial direction of the pair of pad pins, further wherein the hook portions are connected to the caliper to stop the pad pins from coming off of the pin holes of the caliper.
5. The disk brake as in claim 1, wherein the bias member includes a pad holding portion connected to the pad to elastically hold the pad.
6. A disk brake comprising:
a caliper having an opening, wherein the opening includes two edges, the caliper further including pin holes positioned adjacent to the two edges,
a pad positioned in the opening of the caliper,
a pair of pad pins connectable to the pin holes of the caliper and able to movably support the pad; and a bias member capable of biasing the pair of pad pins in at least one of a mutually approaching direction and a mutually separating direction, wherein the bias member includes a body member having pawls engageable with the pair of pad pins to elastically push the pair of pad pins against hole wall surfaces of the pin holes of the caliper, the bias member includes a hook member which extends in the same direction as a longitudinal direction of the body member and which has hook portions connected to the caliper at both ends to inhibit the bias member from moving in an axial direction of the pad pins, the body member and the hook member have respective plate shapes, and the body member and the hook member are stacked in layers and are connected to each other substantially centrally by a rivet.

7. The disk brake as in claim 6, wherein the bias member is capable of functioning as a plate spring member.

8. The disk brake as in claim 6, wherein an engagement portion is positioned in each of the pair of pad pins, further wherein the pawls of the bias member are connectable into the engagement portions to inhibit movement of the bias member in an axial direction of the pair of pad pins.

9. The disk brake as in claim 6, wherein the bias member includes a pad holding portion connected to the pad to elastically hold the pad.

* * * * *